Patented Sept. 27, 1938

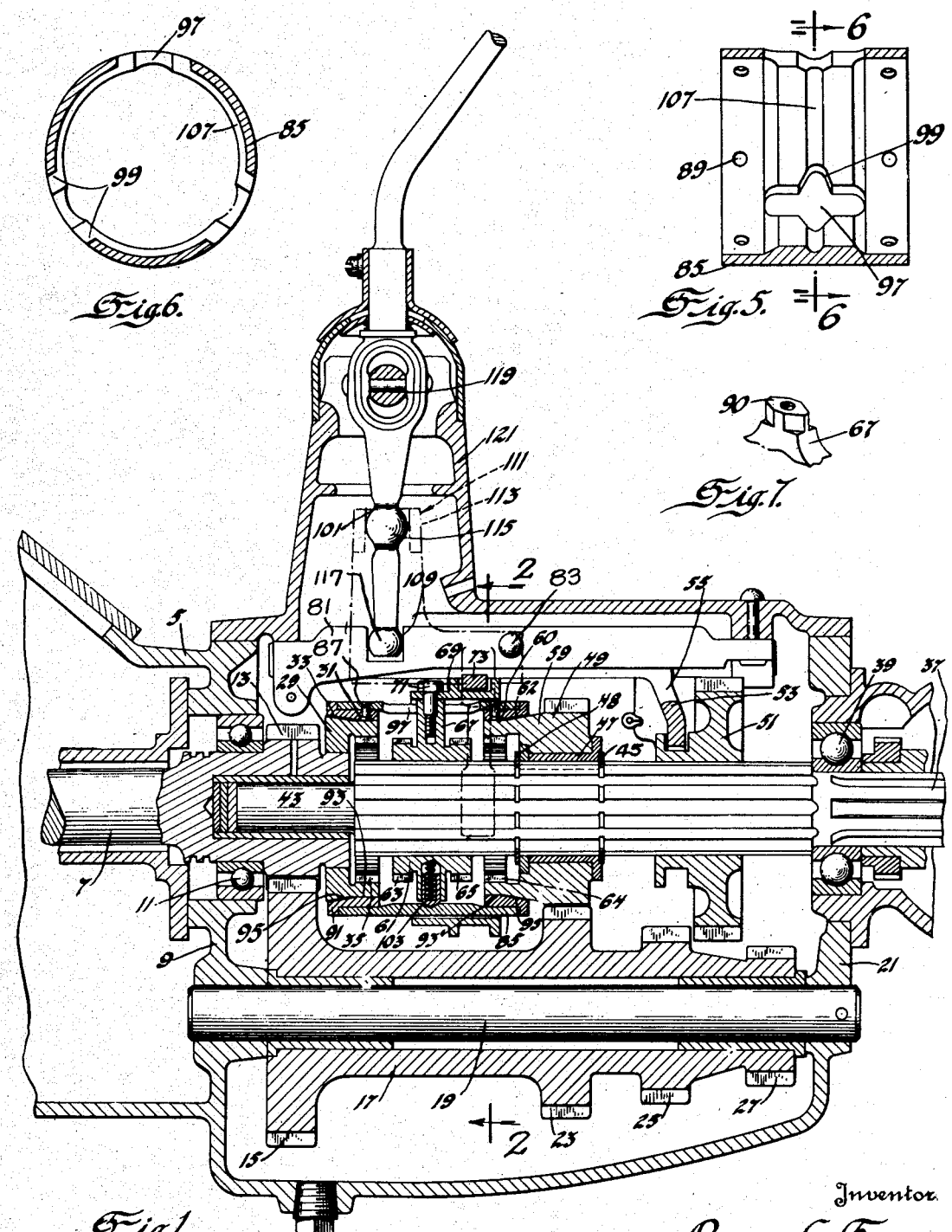

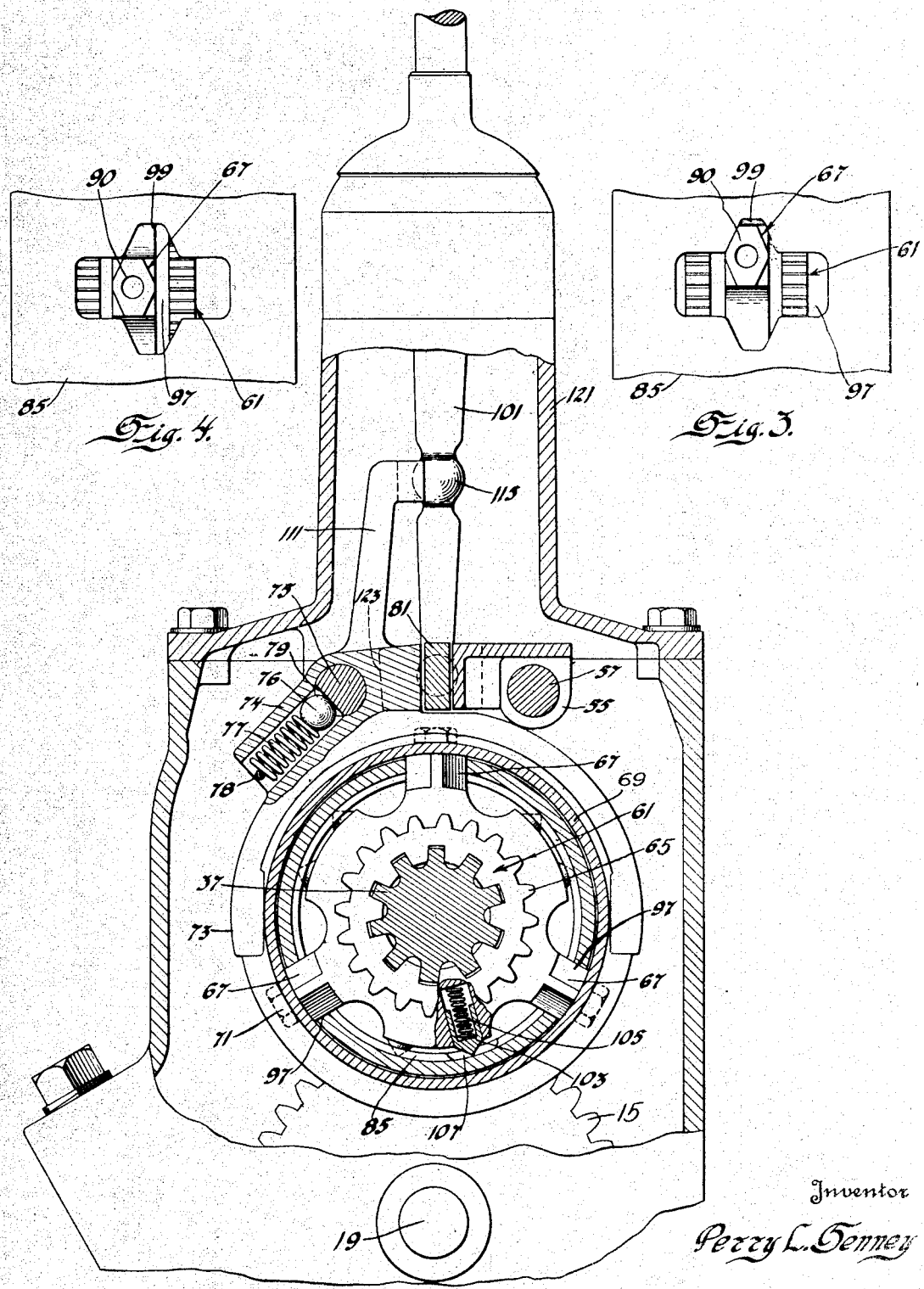

2,131,199

UNITED STATES PATENT OFFICE 2,131,199

SYNCHRONIZING TRANSMISSION MECHANISM

Perry L. Tenney, Muncie, Ind., assignor to General Motors Corporation, Detroit, Mich., a corporation of Delaware Application July 17, 1929, Serial No. 378,910

12 Claims. (Cl. 192—53)

This invention relates to change speed power transmission mechanism and is especially designed for use on vehicles.

An object of the invention is to provide for making speed ratio changes noiselessly.

As a further object the invention aims to accomplish its major object with a construction which is simple, easy to assemble and inexpensive to manufacture.

Other objects and advantages will be understood from the following specification and the accompanying drawings.

In the drawings:

Figure 1 is a longitudinal vertical section through the transmission mechanism.

Figure 2 is a transverse section on line 2—2 of Figure 1.

Figure 3 is a top plan view of a portion of the device showing one relative position of parts.

Figure 4 is a similar view showing the parts in another relative position.

Figure 5 is a longitudinal section through one element of the transmission.

Figure 6 is a section on line 6—6 of Figure 5.

Figure 7 is a detail in perspective.

Referring by reference characters to the drawings, numeral 5 represents the housing for enclosing the power transmission mechanism. Numeral 7 represents a driving shaft rotatably supported in front wall 9 of the casing by anti-friction bearings 11. This shaft 7 has a gear 13 in constant mesh with gear 15 of countershaft 17, the latter rotatably mounted on shaft 19, supported in the front wall 9 and in the rear wall 21. The countershaft has rigid therewith a second speed driving gear 23, a low speed driving gear 25 and a gear 27 to constantly drive a reverse idler. A ring 29 having an external cylindrical face 31 and a conical face 33 extending from face 31 is carried rigidly by the extreme inner end of shaft 7. The ring 29 is internally provided with clutch teeth 35.

The driven spline shaft 37 is rotatably supported by bearings 39 in the rear wall 21 and its front end is reduced as at 43 and rotatably supported in the recessed end of shaft 7. Suitable fastening means 45 and 46 on the splined shaft 37 retain in position on said shaft a flanged sleeve 47. The second speed driven gear 49 is rotatable on the sleeve. It is retained from axial movement by the flange of the sleeve 47 and by the ring 48. It is in constant mesh with gear 23 on the countershaft. A slidable gear 51 on the driven shaft is movable into mesh with gear 25 on the countershaft for low speed driving, and is movable into mesh with the usual reverse idler driven by gear 27 for reverse driving. Gear 51 is moved by a fork 53 carried by a rail 55, slidable on a fixed rod 57.

The second speed driven gear 49 is provided with a ring 59 having a cylindrical external face 60 and an external conical friction face 62. This ring 59 also has internal teeth 64. This ring 59 with its external surfaces and internal teeth corresponds with the ring 29 carried by the driving shaft.

Slidable on but non-rotatable relative to the driven splined shaft 37 is a clutch element 61 having clutch teeth 63 and 65, the former to at times mesh with teeth 35 and the latter to interlock with teeth 64. The clutch element 61 has a plurality of radial lugs 67 (three being shown). A channel-shaped collar 69 rests on and is secured to the extremities of the radial lugs by fastening means 71 threaded into the said lugs. The channel of collar 69 receives the semi-circular fork 73 rigid with a second rail 74 which is slidable on a second rod 75. There may be used a detent 76 actuated by a spring 77 operating against an abutment 78, the detent 76 engaging recesses in the fixed rod, one being shown at 79, the purpose being to locate the rail in its active and neutral positions. Between the rails is a fixed rod 81 apertured to receive a ball 83 serving as an interlock in the well known way. This ball is moved transversely by one or the other of the rails when moved from neutral position and serves to lock the other rail from movement.

A friction clutch element carrier in the form of a cylindrical barrel 85 has secured thereto, as by rivets 87 extending through openings 89 at its ends, friction members 91. These friction members have cylindrical surfaces 93 and conical friction surfaces 95. The linear and radial dimensions of the barrel are such that when assembled in position as shown in Figure 1 the barrel is freely rotatable about the rings 29 and 59, the cylindrical surfaces affording free rotation. The three radial lugs on element 61 terminate in ends 96 tapered or inclined tangentially in both directions as shown in Figure 7. These double tapered ends are received in openings 97 of the barrel as shown. The openings are elongated and of such width at their ends as to accommodate the longer dimension of the tapered ends of lugs 67. Between the ends of opening 97 are oppositely disposed notches 99, the walls of which are tapered or inclined in tangential planes to at times engage the tapered ends of lugs 67 in the manner which will be obvious. Said tapered or inclined cooperating surfaces of barrel 85 and toothed clutch member 61 constitute cooperating detents for a purpose presently to be described. The rails 74 and 55 are to be operated by shift lever 101. The clutch element 61 has, between each two lugs 67, a pair of detents 103 radially projected by springs 105 into an annular groove 107 of the barrel 85.

For low speed and reverse, the lever 101 is moved transversely through a notch 109 in the fixed member 81 to engage rail 55. When rail 55 is moved longitudinally, rail 74 is locked by the interlocking device 83 and rail 55 may be moved to make shifts for low speed or reverse in the usual way.

For shifts into high speed and second speed positions, the shift lever 101 is first moved transversely through the notch 109 in the fixed member 81. The rail 74 has an upwardly directed arm 111 with a bifurcated end 113 straddling a rounded portion 115 on lever 101 above its lower end 117 which engages the rail 55 and below the fulcrum 119 carried by the cover 121. The rail 74 is shaped as shown by the dotted lines 123 in Figure 2 to accommodate the transverse movement of the lower end 117 when the spherical portion 115 engages the projection 113 and also to permit the necessary longitudinal movement of said lower end 117 with respect to the rail. When the rail 74 is moved longitudinally in a forward direction it tends to effect the engagement of teeth 63 and 35. When moved, the spring detents 103 carry the barrel 85 along in an axial direction, so that the friction surfaces 33 and 95 engage. The barrel thus tends to rotate at the speed of part 29 which is rigid with shaft 7, while the clutch element 61 carrying the lugs 67 is bound to rotate with shaft 37. Any relative rotation causes the movement of lugs 67 with the tapered ends 90 into one or the other of notches 99 of the barrel. The rotating shaft 37, assuming it to rotate at a speed above that of shaft 7, operates through the instrumentality of lugs 67 in notches 99 to turn the barrel and through the frictional engagement of the friction clutches to bring the shaft 7 into synchronization with shaft 37. Furthermore, the forward pressure being exerted on lever 101 operates between the lug 67 and the angular faces of notch 99 to increase the frictional engagement and hasten the synchronization. This manually applied pressure cannot push the lug 67 into the end portions of slot 97 because of the relative rotation between the lug 67 and the barrel. Once synchronization has become complete, however, the pressure causes the lug to slide along the wall of notch 99 into the medial line of slot 97 whereupon the lug 67 moves to the end of slot 97 and the teeth 35 and 63 engage. The act of synchronization occurs very rapidly and without noise. Precisely the same operation occurs when shifting into second speed. In this case the teeth 65 engage teeth 64 after synchronization is effected through the friction clutch and the relative movement of parts 67 and 85.

In making the shift into second speed and high-speed it will be observed that a shorter movement of the shift rail 74 is required than is required in shifting gear 51 for low and reverse speeds. It will also be noted that a greater resistance must be overcome owing to the presence of the spring detents 103 when making the shift into second speed or into high speed. To overcome this greater resistance with no greater effort on the part of the operator, the lever arm for shifting rail 74 is made shorter. By this means it will be seen that the operator operates with a greater mechanical advantage when shifting through a smaller distance and when acting against a greater force and with a lesser mechanical advantage in that instance which requires a greater movement and which is accompanied by lesser resistance. Furthermore, it is necessary to apply greater force to press the friction surfaces together in order to insure synchronization in the short time available than is necessary to intermesh the gears. It should be explained that the purpose of the spring detents is not primarily to effect synchronization. These spring detents offer only slight resistance to the movement of the lever but enough resistance to insure the engagement of the friction clutches before the part 67 could by any possibility move into the end portion of slot 97. When the friction face is engaged, should there be any relative rotation between shaft 7 and shaft 37 a relative rotation is at once set up between parts 67 and 85 so that the angular faces 90 engage the angular faces of the notches of the slot. Once these angular faces are engaged the continued pressure on the part of the lever hastens synchronization and it is practically impossible for the operator to move the lugs 67 into the end portions of the slot and engage the jaw clutch teeth until substantial synchronization is effected. By this very simple construction rapid synchronization is effected and clashing of gears absolutely prevented. Even without the spring detents 103, if the external cylindrical bearing surfaces 31 and 60 are nicely fitted within the internal bearing surfaces 93, the circumferential drag on the friction clutch barrel 85 due to differential rotation between the shaft 37 and clutch member 29 or 59, is sufficient to position the lugs 90 in the notches 99.

I claim:

1. In a transmission mechanism, axially aligned driving members each having a frictional clutch element and a positive clutch element, a coaxial driven member, a splined axially slidable positive clutch element on said driven member between said driving members, a carrier surrounding said slidable positive clutch element having a plurality of frictional elements, one associated with each of the aforesaid friction elements, said carrier having slots with transversely positioned symmetrically tapered notches, said axially slidable clutch element having symmetrically tapered lugs, constituting means for driving said carrier, positioned in said slots and engageable with said notches.

2. In a change speed transmission mechanism for vehicles, a driven shaft, a coaxial driving member, said driving member having a friction face and a jaw clutch element, a jaw clutch element slidably but non-rotatably mounted on said driven shaft, a coaxial axially movable barrel having a friction face to engage the first mentioned friction face, said barrel having an axial elongated slot with transverse notches, said slidable jaw clutch having a tapered lug to slide in said slot and to engage the walls of said notches.

3. In a change speed transmission mechanism, cooperating positive clutch elements, one of which is slidable to engage the other, a friction clutch member associated with one of said positive clutch elements, a second cooperating friction clutch member, resilient means through the instrumentality of which said cooperating friction clutch members are engaged upon an initial movement of said slidable clutch element, connecting means between said slidable clutch element and said second friction clutch member, said connecting means having cooperating detent parts and being constructed to provide relative axial movement and also limited relative rotary movement to aline said detent parts in one position of relative axial adjustment between said slidable clutch element and said second frictional clutch member.

4. The invention defined by claim 3, said connecting means including parts having engaging faces angularly related to the direction of axial movement of said slidable clutch element whereby relative axial movement is prevented prior to synchronization.

5. A combined jaw and friction clutch element, a second jaw clutch element slidable to engage the first, a second friction clutch element associated with the second jaw clutch element, yieldable means to resiliently resist relative axial movement of the second jaw clutch element and the second friction clutch element, driving means connecting said second jaw clutch element and second friction clutch element operative to permit a relative axial movement therebetween, and, also, in one position of relative axial movement, a limited relative rotary movement and cooperating detents on said second jaw clutch element and said second friction clutch element adapted to be axially alined by said relative rotary movement.

6. The combination of two coaxial power transmitting members each comprising a toothed clutch element relatively movable axially into and out of intermeshing engagement, with two positively driven friction clutch members, one being fixed axially with the first of said power transmitting members and the other connected to the second power transmitting member so as to be capable of a limited rotation and an axial movement with respect thereto, and also having a cylindrical bearing engagement with said first power transmitting member.

7. The combination of two coaxial power transmitting members each comprising a toothed clutch element relatively movable axially into and out of intermeshing engagement, with two positively driven friction clutch members, one being fixed axially with the first of said power transmitting members and the other connected to the second of said power transmitting members so as to be capable of a limited rotation and an axial movement with respect thereto, coacting cylindrical bearing surfaces on said last named friction clutch member and said first named friction clutch member and said first named power transmitting member and conical friction surfaces merging into said cylindrical bearing surfaces.

8. The combination of two alined power transmitting members each provided with toothed clutch elements, a third coaxial power transmitting member having a splined portion extending between said toothed clutch elements, a double ended toothed clutch element slidable on said splined portion and adapted to be intermeshed with the clutch teeth of either of the aforesaid two alined power transmitting members, friction clutch members rigid with each of said two alined power transmitting members each comprising external conical friction surfaces merging into cylindrical bearing surfaces, a double ended cooperating friction clutch member having corresponding internal conical friction surfaces and cylindrical bearing surfaces, said double ended friction clutch member having a constant bearing on said cylindrical surfaces but having sufficient axial movement to engage or disengage either one of the friction clutch pairs, and a driving connection between the double ended toothed clutch element and said double ended friction clutch member adapted to permit of a limited relative rotation and a relative axial movement, cooperating detent parts on said last named toothed clutch element and friction clutch member arranged in alinement when the friction member is at the end of its limited rotary movement.

9. In a transmission mechanism, axially spaced, coaxial members, each comprising a jaw clutch element and a conical friction clutch element rigidly united one to the other, a spline shaft on which one of said members is free to rotate and to which it may be clutched, a double ended jaw clutch element slidable on said spline shaft and adapted to interlock with either of said axially spaced jaw clutch elements, an axially movable double ended friction clutch element, having conical friction surfaces, centered on and supported by said members, a lost motion driving connection between said double ended slidable jaw clutch element and said double ended friction clutch element, including a radial lug on one and a slot in the other provided with oppositely inclined detents arranged to be alined with the lugs to oppose axial movement of the slidable jaw clutch element in either direction under conditions of asynchronous rotation of either member with respect to the spline shaft.

10. The combination defined in claim 9 comprising in addittion a shift collar slidable on said double ended friction clutch element and radially disposed means connecting said shift collar to said slidable jaw clutch element.

11. The combination of two coaxial power transmitting members, each equipped with a toothed positive coupling element, one of which is movable into and out of engagement with the other; a friction synchronizing member in positive torque transmitting connection with each power transmitting member, respectively, one of said friction members being disposed concentrically with respect to the movable coupling element and having a lost motion connection with the member by which it is driven and capable of axial movement whereby it may be frictionally engaged with its companion; yieldable means connecting the movable positive coupling element with the concentrically disposed axially movable friction member and means for moving the positive coupling element toward engagement with its companion, thereby moving said movable friction member into light frictional engagement with its companion; and cooperating detents on said lost motion connected and axially movable member and movable positive coupling element adapted to be alined as a result of said light engagement of the friction surfaces of said friction members.

12. A combination as defined in claim 11 in which the yieldable means connecting the movable coupling element with the concentrically disposed lost motion connected and axially movable friction member consists of radially movable spring pressed plungers.

PERRY L. TENNEY.

CERTIFICATE OF CORRECTION.

Patent No. 2,131,199. September 27, 1938.

PERRY L. TENNEY.

It is hereby certified that error appears in the printed specification of the above numbered patent requiring correction as follows: Page 3, first column, line 1, claim 3, after the word and comma "member," insert whereby the latter is driven by the former; and that the said Letters Patent should be read with this correction therein that the same may conform to the record of the case in the Patent Office.

Signed and sealed this 29th day of November, A. D. 1938.

Henry Van Arsdale (Seal) Acting Commissioner of Patents.